United States Patent
Iftime et al.

(10) Patent No.: US 7,195,802 B2
(45) Date of Patent: Mar. 27, 2007

(54) MULTI-COLOR CHOLESTERIC LIQUID CRYSTAL DISPLAY

(75) Inventors: Gabriel Iftime, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 237 days.

(21) Appl. No.: 11/003,169

(22) Filed: Dec. 3, 2004

(65) Prior Publication Data

US 2006/0118762 A1 Jun. 8, 2006

(51) Int. Cl.
  *C09K 19/36* (2006.01)
  *C09K 19/54* (2006.01)
(52) U.S. Cl. ............... 428/1.3; 428/1.1; 252/299.5; 252/299.7
(58) Field of Classification Search ............... 428/1.1, 428/1.3; 252/299.5, 299.7
See application file for complete search history.

(56) References Cited

U.S. PATENT DOCUMENTS

| | | |
|---|---|---|
| 3,680,950 A | 8/1972 | Haas et al. |
| 3,697,150 A | 10/1972 | Wysocki |
| 5,691,798 A | 11/1997 | Smith |
| 6,665,042 B1 | 12/2003 | Marshall et al. |
| 6,767,480 B2 | 7/2004 | Iftime et al. |
| 6,824,708 B2 | 11/2004 | Iftime et al. |
| 2004/0115366 A1 | 6/2004 | Iftime et al. |

FOREIGN PATENT DOCUMENTS

| | | |
|---|---|---|
| EP | 1439215 | 7/2004 |
| WO | WO 02/25364 | 3/2002 |

OTHER PUBLICATIONS

Li, Zili et al., "Electrically Tunable Color (ETC) for Full-Color Reflective Displays", Conference Record of the 20th International Display Research Conference, Palm Beach, Florida, Sep. 25-28, 2000, International Display Research Conference (IDRC), San Jose, CA: SID, US, vol. CONF. 20, Sep. 25, 2000, pp. 265-268.
European Search Report.

*Primary Examiner*—Shean C Wu
(74) *Attorney, Agent, or Firm*—Eugene O. Palazzo; Fay Sharpe LLP

(57) ABSTRACT

A cholesteric display including a cholesteric liquid crystal, and a dipolar dopant having limited miscibility in the cholesteric liquid crystal is provided. In accordance with another aspect, a process is provided for forming a cholesteric liquid crystal composition by dissolving a dipolar dopant having limited solubility into a cholesteric liquid crystal. The liquid crystal composition can be utilized to produce a cholesteric display. The liquid crystal domains in the liquid crystal composition rotate away from a planar state in the presence of an applied electric field and the degree of rotation is a function of the applied electric field strength. The reflected color is then a function of the applied electric field.

23 Claims, 3 Drawing Sheets

MULTI-COLOR CHOLESTERIC LIQUID CRYSTAL DISPLAY

BACKGROUND

Illustrated herein in embodiments are liquid crystal displays (LCDs) and, more particularly, cholesteric multi-color liquid crystal displays.

Cholesteric liquid crystal displays have attracted attention in recent years as an electronic paper (e-paper) type of display device. It would be particularly advantageous to develop an effective and inexpensive multi-color e-paper. However, successful demonstrations of cholesteric multi-color displays have so far involved a three-layer stack of cholesteric displays, with each layer reflecting a primary color, e.g. red, green or blue. Unfortunately, this type of a display is comparatively expensive and consumes a great deal of power, rendering it unsuitable for inexpensive portable displays utilizing battery power. A single-layer cholesteric color display would be less expensive to manufacture and more suitable as a multicolor electronic paper, requiring less power to operate than a three-layer design while, at the same time, being more flexible and durable than a three-layer design.

Color change of a single-layer cholesteric display has been previously demonstrated by switching with an electric field with voltages in the 300V range. However, such high voltage requirements are not suitable or practical for battery operated portable displays. Another known method involves a photochemical color change. Unfortunately, this involves an hours-long process to generate a display image, and the image is subject to later pollution and degradation from ambient light. Still another method produces a color change when polymeric cholesteric flakes suspended in an inert fluid are rotated by an applied electric field. However, it is very difficult to prepare the polymeric cholesteric flakes in the very narrow size distribution required, and different size flakes rotate at different voltage levels, making the display difficult to control.

Therefore, there is a need for a single-layer cholesteric multi-color display with a lower operating voltage than presently required, thereby also providing a more practical embodiment of multi-color electronic paper which consumes less power than present designs.

BRIEF DESCRIPTION

In accordance with one embodiment of the disclosure, there is provided a cholesteric display including a cholesteric liquid crystal and a dipolar dopant having limited solubility dissolved therein.

In accordance with another embodiment of the disclosure, there is provided a process for forming a cholesteric liquid crystal composition comprising dissolving a dipolar dopant having limited miscibility with the cholesteric liquid crystal material.

In accordance with still another embodiment of the disclosure, there is provided a device having a liquid crystal composition including a cholesteric liquid and a dipolar dopant having limited solubility dissolved therein. Liquid crystal domains in the liquid crystal composition rotate away from a planar state in the presence of an applied electric field and the degree of rotation is a function of the applied electric field strength.

These and other non-limiting aspects of the development are more particularly disclosed below.

BRIEF DESCRIPTION OF THE DRAWINGS

The following is a brief description of the drawings, which are presented for the purposes of illustrating the development disclosed herein and not for the purposes of limiting the same.

DETAILED DESCRIPTION

The present disclosure describes introducing a dipolar dopant into a cholesteric mixture which is selected to reflect visible light. A dipolar molecule with only limited solubility in the liquid crystal is dispersed into the liquid crystal mixture. The reflected wavelength (color) changes, as a function of an applied electric field which rotates the dipolar molecules. The reflected wavelength changes due to a rotation of the cholesteric liquid crystal domains which are coerced into rotation by the rotation of the dipolar molecules.

A more complete understanding of the processes and apparatuses disclosed herein can be obtained by reference to the accompanying drawings. These figures are merely schematic representations based on convenience and the ease of demonstrating the present development, and are, therefore, not intended to indicate relative size and dimensions of the display devices or components thereof and/or to define or limit the scope of the exemplary embodiments.

Figure 2:
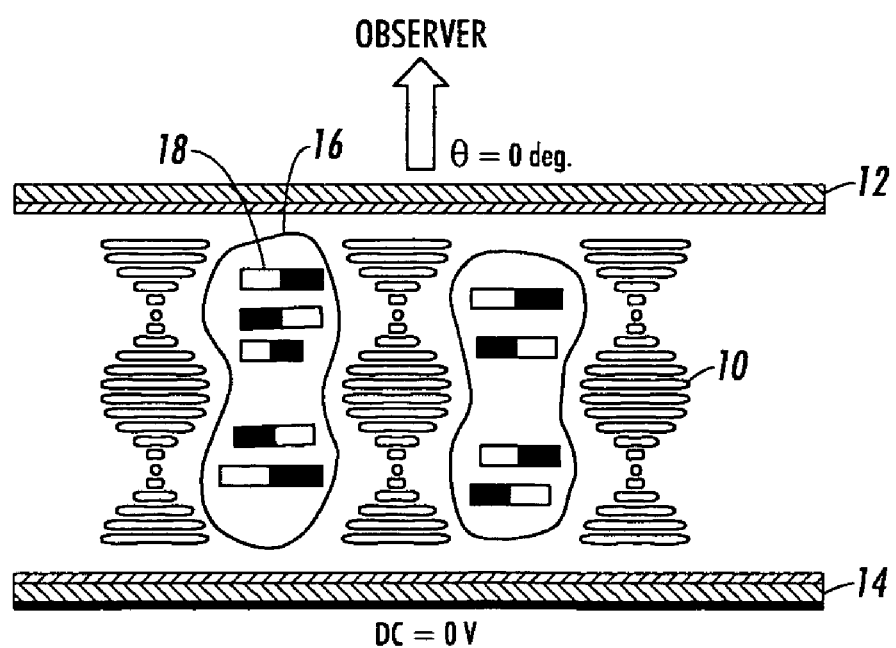
FIG. 2 is a simplified elevational view of a liquid crystal display embodiment having liquid crystals in a planar state.

With reference to FIG. 2, cholesteric liquid crystals 10 reflect color when they are arranged in the planar texture as shown in the figure, i.e. when the axis of the helix lies normal to the substrates 12, 14. The reflected color is controlled by the helical pitch of the cholesteric mixture, the helical pitch being the distance it takes for the director of the cholesteric liquid crystal 10 to go through one complete rotation of 360 degrees. The director is defined as the molecular direction of preferred orientation in liquid crystalline mesophases.

The change in reflected color is based on a coerced rotation of small planar domains of the cholesteric liquid crystals 10 by the rotation of nearby domains 16 containing the dipolar molecule 18. Initially, for example, the liquid crystal cell reflects red light. As shown in FIG. 2, for a given voltage applied to transparent electrodes 13, 15 for generating an applied electric field 20, the helix is rotated through an angle θ (22), and the reflected wavelength is decreased. In this example, the cell takes on a green appearance.

The reflected color in a planar cholesteric display is a function of the viewing angle. In the case described above, the reflected color is a function of the angle θ (22) between the direction of the helix axis and the direction perpendicular to the display substrates 12, 14 given by:

$$\lambda_{reflected} = \lambda_0 \cdot \cos\theta$$

where $\lambda_0$ is the reflected wavelength at θ=0.

Figure 1:
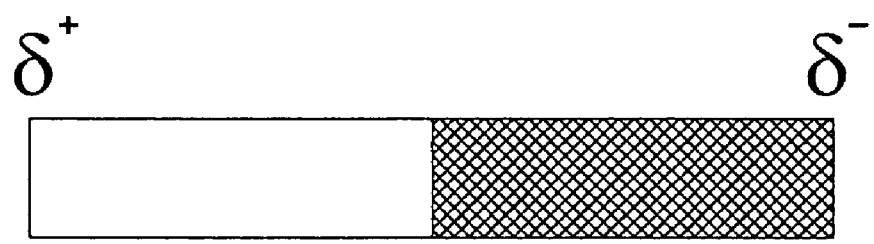
FIG. 1 is a schematic representation of a dipolar molecule.

The dipolar molecule (see FIG. 1) consists of an electron donor group and an electron acceptor group connected at the ends of a conjugated path. This results in the general structure: Donor—Conjugated Path—Acceptor. The electron donor is an atom or a group of atoms that have a negative Hammett parameter. The electron acceptor is a group of atoms having a positive Hammett parameter. Donor group is selected from an atom selected from the group consisting of N, O, S, and P, where the valence of the atom is satisfied by bonding to at least one other moiety to satisfy the valence of the atom; the other moiety or moieties to satisfy the valence of the atom selected as the electron donor moiety may be for instance a hydrogen atom, or short hydrocarbon group such as a straight alkyl chain having for example 1 to about 3 carbon atoms.

The conjugated bridging moiety may be any suitable group through which electrons can pass from the electron donor moiety (D) to the electron acceptor moiety (A). In embodiments, the conjugated bridging moiety (C) is a selected from the following:

(a) phenyl ring.
(b) fused aromatic rings having for instance from about 10 to about 50 carbon atoms such as 1,4-C10H6 and 1,5-C10H6.

Electron acceptor group is selected from:

The electron acceptor moiety (A) may be any suitable atom or group capable of accepting electrons. In embodiments, the electron acceptor moiety (A1,A2) is an electron withdrawing functional moiety which according to Hammett equation possesses a positive Hammett constant. The electron acceptor moiety may be for example the following:

(a) an aldehyde (—CO—H);
(b) a ketone (—CO—R) where R may be for example a straight chain alkyl group having for example 1 to about 3 carbon atoms, such as methyl, ethyl, propyl and isopropyl.
(c) an ester (—COOR) where R may be for example a straight chain alkyl group having for example 1 to about 3 carbon atoms, such as methyl, ethyl, propyl and isopropyl.
(d) a carboxylic acid (—COOH);
(e) cyano (CN);
(f) nitro (NO2);
(g) nitroso (N=O);
(h) a sulfur-based group (e.g., —SO2—CH3; and —SO2—CF3);
(i) a fluorine atom;
(k) a boron atom.

Figure 4:
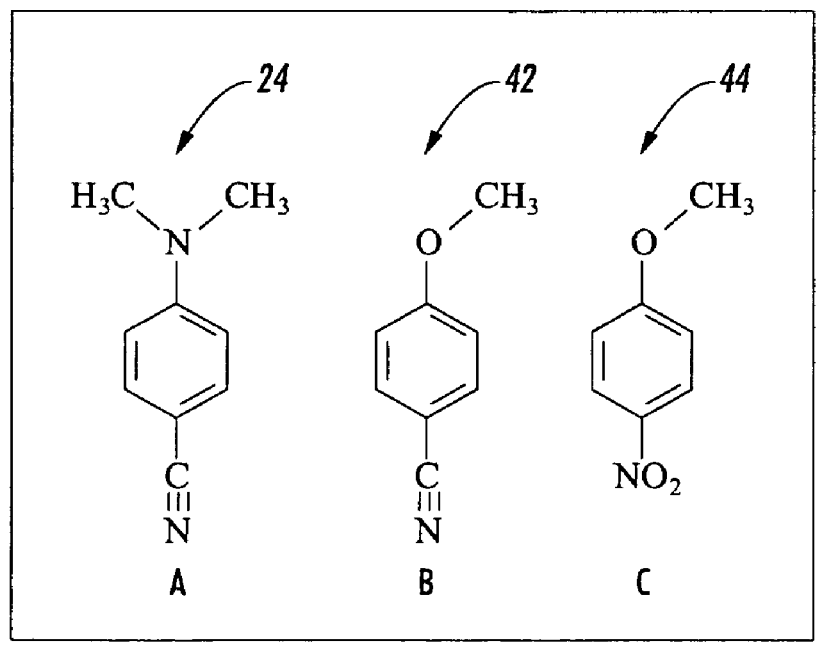
FIG. 4 depicts dipolar dopants suitable for practicing embodiments of the present disclosure.

Examples of some dipolar molecules which are suitable for the described color switching method are shown in FIG. 4. The molecules shown are small molecules having dipole moments preferably as high as possible, but which are not colored.

The dipolar molecules are selected such that they melt at a temperature not higher than the temperature at which the liquid crystal starts boiling, because this results in change of the composition of liquid crystal due to evaporation. In a preferred embodiment, the dipolar dopant is completely soluble or miscible in the liquid crystal at a temperature at which the liquid crystal becomes isotropic, i.e. displays no liquid crystalline behavior. Additionally, upon cooling to room temperature, the dipolar dopant becomes phase separated from the liquid crystal material.

A liquid crystal is an organic compound in an intermediate or mesomorphic state between solid and liquid. These compounds are a crystalline solid until heated to become a turbid liquid, or liquid crystals. On further heating, the liquid becomes isotropic. This sequence is reversed when the substance is cooled. Many of the commercially available liquid crystals are liquid crystals at the ambient conditions. Many organic compounds exhibiting this behavior are known and used extensively in electric and electronic displays, thermometers, LCD TV sets, electronic clocks and calculators, and similar devices dependent on temperature determination. Liquid crystals have several varieties of molecular order: nematic, smectic, and cholesteric.

In this regard, cholesteric is a molecular structure found in some liquid crystals, so called because it was first noted in cholesteryl alcohol. It occurs in some optically active compounds and in mixtures of chiral compounds and nematic liquid crystals.

Suitable cholesteric liquid crystal materials for use herein include for example BL mixtures available from EM Industries, Inc., Hawthorne, N.Y. (BL088, BL 90, BL94 and BL108 as a few examples). The helical pitch is tuned to the desired range by mixing this cholesteric liquid crystal mixture with a nematic liquid crystal. Examples of nematic liquid crystal BL mixtures available at EM Industries, Inc., BL001 (E7), BL002 (E8), BL033 (version of BL002) and BL087, and 5CB (commercially available at Sigma-Aldrich). The cholesteric liquid crystal composition is adjusted in such a way as to reflect light in the visible range (from about 400 nm to about 730 nm) when is aligned in its planar state.

In one embodiment, a display is fabricated by melting a mixture of cholesteric liquid crystal BL088 (available from Merck Ltd.) and 17% (w/w) N,N-dimethyl-benzonitrile (24, in FIG. 4) between two indium-tin-oxide (ITO) coated glass slides, which act as a liquid crystal cell. When cool, e.g. room temperature, the sample embodiment reflects a red color.

Figure 5:
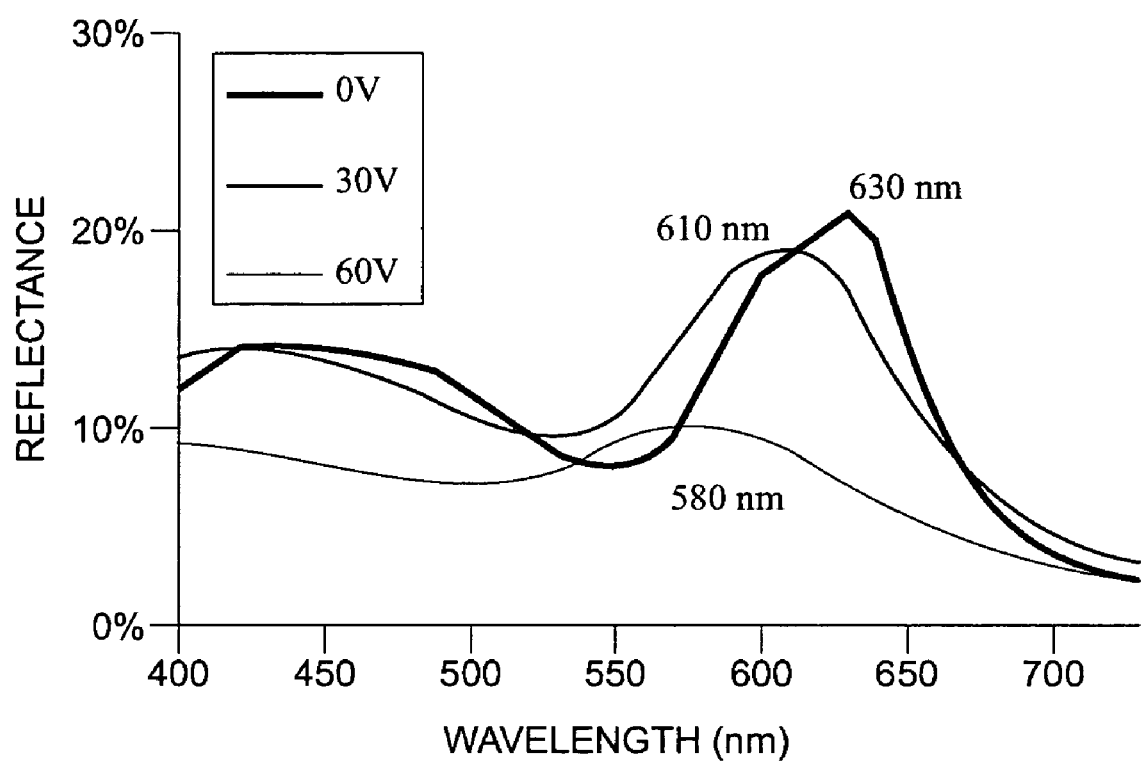
FIG. 5 is a graph of reflectance versus wavelength for different applied voltages in one embodiment of a liquid crystal device.

When a DC voltage is applied, generating an electric field between the substrates, a shift of the reflected wavelength is observed. The shift becomes larger as the voltage is increased, and the shift is consistent with rotation of the helices of the cholesteric domains. With reference now to FIG. 5, a graph is provided showing percentage of reflectance 30 as a function of wavelength 32 at three different applied voltages when utilizing the above-described N,N-dimethyl-benzonitrile dopant (24). The shift of the peak of the reflected wavelength curve from 630 nm at 0 V (34), to 610 nm at 30 V (36), and to 580 nm at 60 V (38) is shown.

Figure 3:
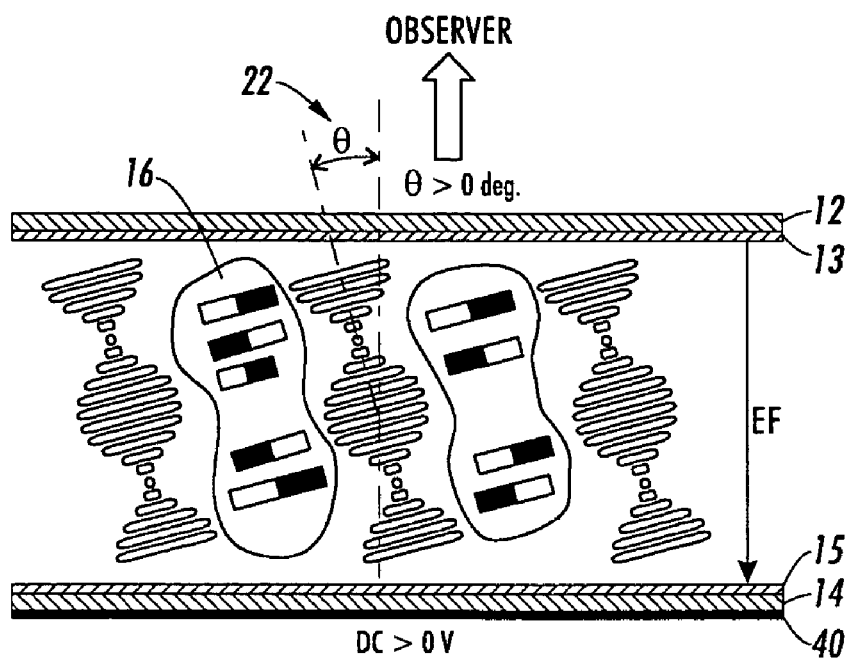
FIG. 3 is a simplified elevational view of a liquid crystal display embodiment having liquid crystals in a rotated state.

At higher voltages, a transparent state is obtained as the liquid crystal helices (10) rotate toward a focal-conic state, or break up in a homeotropic state at even higher voltages. Because the back of the display is coated with a black absorptive layer (40 in FIG. 3), an observer sees black in the transparent state. Without the dipolar dopant (24), no shift is observed. Rather, only a sudden change to the homeotropic or focal-conic states is observed, both of which are transparent.

As it can be observed from FIG. 5, a relatively strong reflection is also observed in the region of 400–500 nm for each of the three reflectance curves. Because the dipolar dopant (24) is not colored, this reflection can not be attributed to the dopant. Rather, the reflection is believed to be due to the rotation of the domains (16 in FIG. 3) containing the inserted dipolar molecule 24. It is probable that they rotate more when compared with dopant free domains. This side effect is probably due to the fact that a small amount of the dipolar molecule 24 is miscible with the liquid crystal 10. Use of dopants containing fewer methyl groups (for example, 42, 44 in FIG. 4) is expected to decrease this side effect.

Planar alignment layers may be optionally be coated on the surface of the electrodes. This results in improved planar alignment of the helices in the color reflecting state which provides more saturated reflected color. Surface alignment layers for planar alignment are known and they include for example thermally cross-linkable polyimides as for example those produced by Nissan Chemical Ind., Ltd. Improved planar alignment is provided by rubbing the polyimide coated substrates.

Important factors for the fabrication of a good quality multi-color display include relatively poor miscibility of the dipolar dopant with the cholesteric liquid crystal, and the formation of essentially transparent domains containing the dipolar molecules. Formation of large crystals of dopant should be avoided so that the display does not scatter light and, as a consequence, have a white appearance.

It is to be appreciated that selective areas of a display and surrounding areas can be switched independently so that an image can be generated on the display. Each of selective display areas can be switched as necessary, to a selective colored state, or to a transparent (black) state.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A cholesteric display composition comprising:
   (a) a cholesteric liquid crystal reflecting light in the visible region of the spectrum; and
   (b) a dipolar dopant having limited miscibility mixed with the cholesteric liquid crystal;
   wherein the dipolar dopant comprises one of the following molecules:

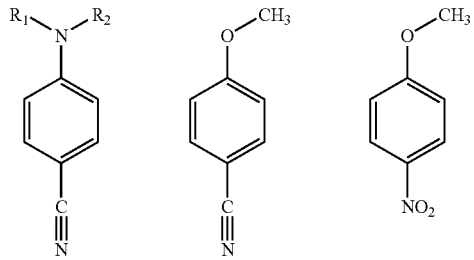

wherein $R_1$ and $R_2$, are independently selected from hydrogen and methyl.

2. The composition of claim 1, wherein the dipolar dopant is phase separated from the liquid crystal at room temperature.

3. The composition of claim 1, wherein the reflected light is from about 400 nm to about 730 nm.

4. The composition of claim 1, wherein the dipolar dopant has a melting point less than the boiling temperature of the cholesteric liquid crystal.

5. The composition of claim 1, wherein the dipolar dopant is present in an amount from about 15% to about 20% by weight with respect to the amount of the cholesteric liquid crystal.

6. The composition of claim 1, wherein the dipolar dopant comprises N,N-dimethyl-benzonitrile.

7. The composition of claim 1, wherein the dipolar dopant is not colored.

8. The composition of claim 1, wherein the dipolar dopant is 4-methoxy-benzonitrile.

9. The composition of claim 1, wherein the dipolar dopant is 1-methoxy-4-nitrobenzene.

10. A process for forming a cholesteric display comprising:
    (a) providing a cholesteric liquid crystal;
    (b) dissolving a dipolar dopant having limited miscibility into the cholesteric liquid crystal to form a cholesteric liquid crystal composition; and,
    (c) adding the cholesteric liquid crystal composition to a liquid crystal display well;
    wherein the dipolar dopant comprises one of the following molecules:

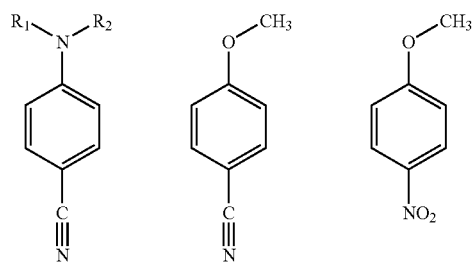

wherein $R_1$ and $R_2$ are independently selected from hydrogen and methyl.

11. The cholesteric display produced by the process of claim 10.

12. The process of claim 10, wherein dipolar dopant is dissolved into the liquid crystal in an amount of from about 15% to about 20% by weight with respect to the amount of the liquid crystal composition.

13. The process of claim 10, wherein at room temperature, the dipolar dopant is phase separated from the liquid crystal.

14. The process of claim 10, wherein the dipolar dopant is 4-methoxy-benzonitrile.

15. The process of claim 10, wherein the dipolar dopant is 1-methoxy-4-nitrobenzene.

16. A device comprising a liquid crystal composition including a cholesteric liquid and a dipolar dopant having limited solubility therein, wherein liquid crystal domains in the liquid crystal composition rotate away from a planar state in the presence of an applied electric field and the degree of rotation is a function of the applied electric field strength; and
    wherein the dipolar dopant comprises one of the following molecules:

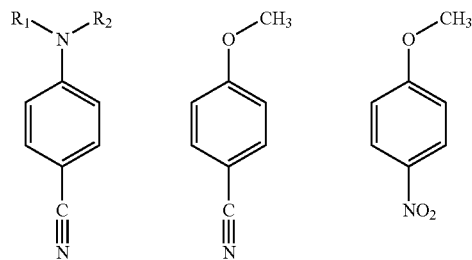

wherein $R_1$ and $R_2$ are independently selected from hydrogen and methyl.

17. The device of claim 16, further comprising:
    an electric field generator that electrically induces the rotation of the liquid crystal domains.

18. The device of claim 16, further including a colored surface positioned to absorb a portion of a predetermined light that passes through the cholesteric liquid when in a focal-conic or in homeotropic state such that an observer sees a predetermined color.

19. The device of claim 16, wherein the cholesteric liquid crystal is substantially transparent to the predetermined light when in the focal-conic state or homeotropic state to allow passage of the predetermined light through the cholesteric liquid, and to allow exit of the non-absorbed portion of the predetermined light from the cholesteric liquid.

20. The device of claim 16, wherein the dipolar dopant is present in an amount of about 15% to about 20% by weight with respect to the amount of the cholesteric liquid.

21. The device of claim 16, wherein the dipolar dopant is N, N-dimethyl-benzonitrile.

22. The device of claim 16, wherein the dipolar dopant is 4-methoxy-benzonitrile.

23. The device of claim 16, wherein the dipolar dopant is 1-methoxy-4-nitrobenzene.

* * * * *